United States Patent

Ebbe et al.

[15] 3,703,610

[45] Nov. 21, 1972

[54] PARTY-LINE BRIDGE-LIFTER

[72] Inventors: Grace Lakin Ebbe, Clark; Gustav Paul Marki, Holmdel, both of N.J.

[73] Assignee: Bell Telephone Laboratories, Incorporated, Murray Hill, N.J.

[22] Filed: Aug. 21, 1970

[21] Appl. No.: 66,022

[52] U.S. Cl. ....................179/35

[51] Int. Cl. ....................H04m 5/00

[58] Field of Search ....179/34, 35, 2.5 A, 16 F, 17 B, 179/1 CN

[56] References Cited

UNITED STATES PATENTS

| | | | |
|---|---|---|---|
| 2,216,650 | 10/1940 | Nelson | 179/34 |
| 2,912,503 | 11/1959 | Grandstaff et al. | 179/1 CN |

*Primary Examiner*—Kathleen H. Claffy
*Assistant Examiner*—T. Kundert
*Attorney*—R. J. Guenther and James Warren Falk

[57] ABSTRACT

A bridge-lifter circuit arranged to match the impedance of party-line off-hook transmission facilities to the impedance of a common transmission line. Circuitry is provided so that when one party-line transmission facility is off-hook a high impedance is switched in series with the remaining on-hook party-line facilities to effectively remove the bridged impedances from across the off-hook facility. When more than one transmission facility is off-hook, an impedance matching transformer, arranged to pass d.c. supervisory signals, is serially inserted between the common transmission line and off-hook party-line transmission facilities to match the combined impedances of the bridged facilities to the impedance of the common line.

11 Claims, 1 Drawing Figure

PATENTED NOV 21 1972 3,703,610
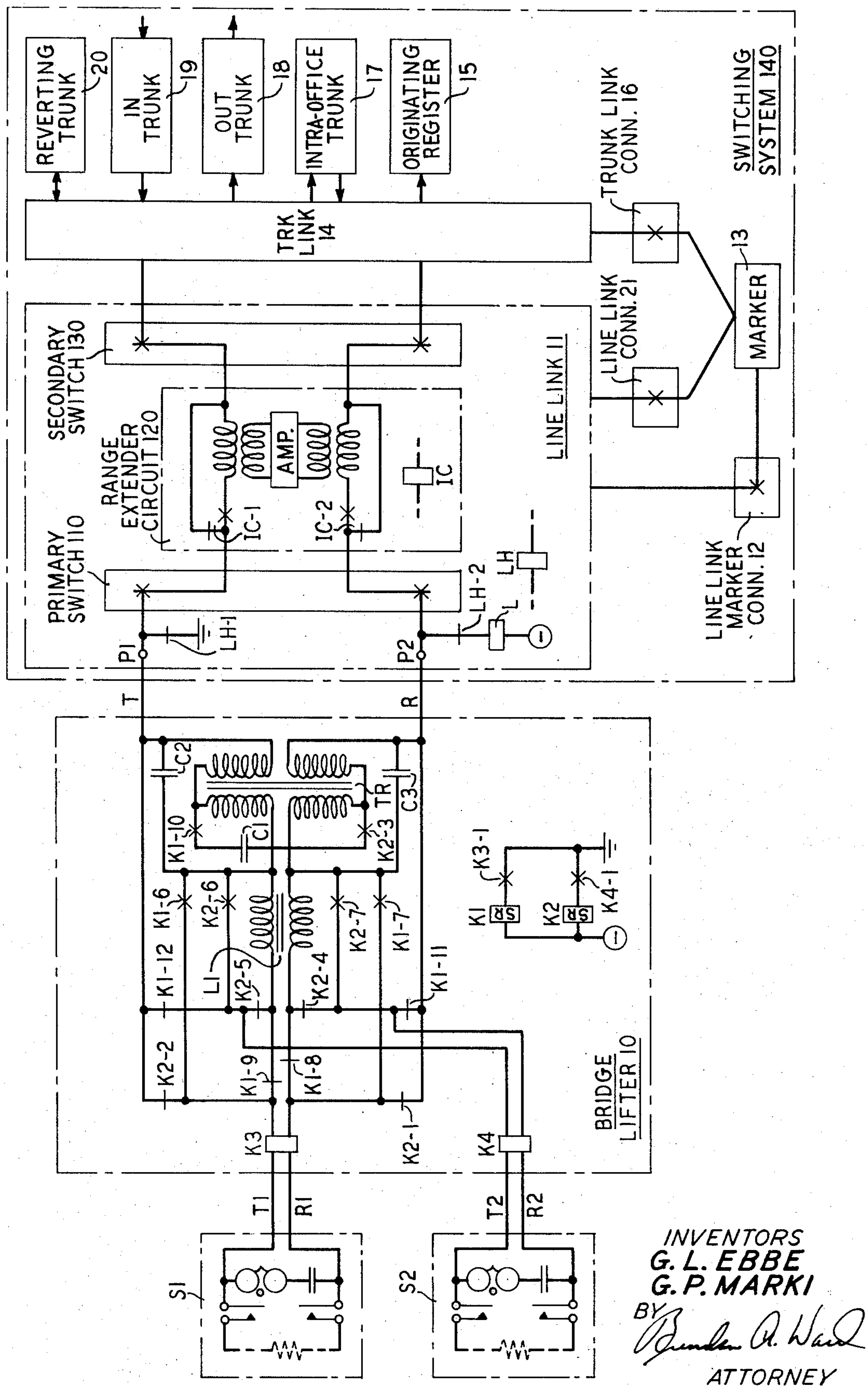
INVENTORS
G. L. EBBE
G. P. MARKI
BY Brenden A. Ward
ATTORNEY

PARTY-LINE BRIDGE-LIFTER

BACKGROUND OF THE INVENTION

1. Field of the Invention

This invention concerns communication systems. In particular it relates to party-line communication systems in which station lines are bridged across a common line and in which an impedance match is maintained between the bridged off-hook station lines and the common line.

2. Description of the Prior Art

The economic advantages of party-line systems are often considerably offset by technical disadvantages encountered in providing service to party-line stations. A typical example in the telephone art has been the problem of improving the transmission of voice frequency signals from the remotely located subscribers of party-line systems. In order to understand this problem it is first necessary to consider the nature of the typical telephone plant facilities that extend from the party-line station to the telephone switching office.

Conventional telephone plant cables and wire line facilities have, in the past, been designed in accordance with the distance between subscriber subsets and a telephone switching office. The impedance of a telephone wire pair between the telephone subset and the switching office varies in accordance with the length of a wire pair.

It is apparent that those subscribers who are at a relatively greater distance from the office have a substantially higher loop impedance and, therefore, a higher transmission loss than those subscribers served by the same diameter wires but who are located nearer the switching office.

One ameliorative measure taken in the past was to provide wire pairs on long subscriber lines which are of greater diameter, or lower gauge, than the average wire pairs. The lower gauge wires exhibit a correspondingly reduced impedance per unit length and consequently result in an increased transmission performance on those subscriber lines which extend for long distances from the switching office.

While wholly operative and useful, the above-enumerated remedial measure presents certain operating and economical disadvantages. For example it is apparent to those skilled in the art that cables including such higher diameter pairs will of necessity include fewer pairs per square inch of cable than conventional pairs. It also follows that the enclosures, or conduits, in which such cables are placed can receive a correspondingly reduced number of cables and pairs. Thus, in congested urban areas where underground conduit capacity may be fully utilized, the diameter of the cable pair forces a direct upper limit on the number of subscribers that may be served through a particular channel or conduit. The number of subscribers, if heavier wire pairs are used, is smaller than that available through the use of conventional or smaller diameter wire pairs.

Alternatively, so-called "long-line" circuits have been used to service long subscriber wire pair facilities by providing equipment which would respond to lower current supervisory indications and increase the transmission level of the reduced intensity signals from the subscriber stations. This may be accomplished either on a per line basis or by grouping long-line circuits in the switching office and permitting a relatively larger number of long customer loops to gain access to a smaller number of long-line circuits on a shared basis. An illustration of this type of long-line circuit is disclosed in U.S. Pat. No. 3,339,027, issued Aug. 29, 1967 to A. Feiner et al.

Another consideration in the provision of telephone service to party-line subscribers is the utilization of "-dedicated" party-line facilities. A problem derives from the fact that "dedicated" party lines are, by physical feature, distinct from conventional party lines. The former (dedicated party-line arrangement) encompasses the extension of two individual and independent wire pairs from the switching office to the tip and ring party-line subscribers respectively. At the switching office a common line equipment termination is shared by all of the party-line subscribers.

In consequence, the relatively long wire "runs" to each of the subscriber substations coupled with the economic desirability to reduce the wire diameter gives rise to a situation in which a relatively high capacitance due to the wire pair extending to the tip party, for example, will serve as a "bridge" and adversely affect transmission quality when the wire pair of the ring party is being used for conversation. To this end various types of circuit devices, hereinafter referred to as bridge-lifters, have been employed to neutralize or remove the capacitive bridge of the idle wire pair and thus enhance the quality of transmission of voice signals on the other pair.

The saturable core reactors utilized by the prior art bridge-lifting apparatus, such as disclosed by Lester Hochgraf in U.S. Pat. No. 2,924,667, issued Feb. 9, 1960, have the well-known property of a relatively high inductance when their cores are unsaturated and a relatively low inductance when the cores are saturated. Although the Hochgraf patent is a substantial contribution to the technology certain deficiencies are manifest therein as will be apparent in the following.

Basically the prior art procedure is to insert one of the saturable core reactors disclosed by Hochgraf in each of the bridged wire lines associated with party-line subscribers. When one of the subscriber lines is being utilized for placing or receiving calls, hereinafter referred to as the off-hook state, the corresponding line core reactor is saturated and the line is connected to the switching office common equipment through the low impedance of the core reactor. The core reactor associated with the idle subscriber line, hereinafter referred to as the on-hook line, remains unsaturated and the relatively high impedance effectively removes the bridging effect of the idle line. Thus the switching office equipment is essentially connected to a single subscriber line.

Recognizing the necessity of increasing the transmission level of voice signals on long subscriber lines the above-referred-to Feiner patent employs a switching office amplifier designed to work into the impedance of a single subscriber line facility to improve service to party-line subscribers. In a party-line telephone system it is possible that one party-line subscriber may place a subset in an off-hook state while another subscriber is conversing with another party or that one party-line subscriber may desire to call another subscriber multipled to the same common line termination in a type of call commonly known as a "revertive call." A problem arises in that the prior art core reactors are saturated thereby merely bridging the subscriber lines to the common line terminal through the relatively low impedances of the core reactors. The bridging of the party-line facilities results in an impedance mismatch on the line side of the amplifier used to increase the level of voice signals thereby inhibiting the effectiveness of the amplifier and diminishing the quality of service provided party-line telephone subscribers.

Accordingly, a need exists in the art for an impedance matching arrangement capable of maintaining an impedance match between bridged off-hook station lines and a common transmission line. A need also exists for an arrangement whereby the above impedance match is maintained regardless of whether one or all active station lines are connected to the common transmission line. A need also exists for an arrangement which will maintain the impedance match in an efficient manner readily adaptable to any communication system irrespective of the type of system involved.

Summary of the Invention

In the exemplary embodiment a bridge-lifter device having a plurality of input ports, or appearances, and a single output port, or appearance, is provided to connect party-line telephone facilities to a switching office common line termination. The bridge-lifter device is arranged so that the party-line facilities are bridged to the common line termination and that the impedance of an off-hook line and the combined impedances of off-hook lines are matched to the impedance of the switching office common line termination.

Apparatus is provided for determining the on-hook and off-hook status of each of the party-line subscriber subsets connected by the line facilities to the bridge-lifter device. Additional apparatus is also provided to switch a high impedance in series with the on-hook subscriber lines to effectively remove their impedance from across an off-hook line in order that the impedance of the off-hook line may be properly matched to the impedance of the common terminal. Apparatus is also provided to switch an impedance matching transformer between the bridged off-hook lines and the common terminal to enable the combined impedances of bridged off-hook lines to be matched to the input impedance of the switching office common terminal party-line equipment.

In accordance with one feature of our invention impedance matching apparatus is provided to be switched in series with bridged party-line transmission facilities and a common terminal to match the bridged impedance of the off-hook lines to the switching equipment connected to the common terminal.

Another feature of our invention is the provision of inductive apparatus enabled by an off-hook line to be switched in series with on-hook lines to effectively remove the on-hook line impedance from across the connection of the off-hook line to the common terminal.

In accordance with still another feature of our invention the foregoing features may be accomplished in a party-line telephone system arranged to be used with existing prior art switching systems without complex changes in existing circuitry.

DESCRIPTION OF THE DRAWING

The foregoing objects, features and advantages, as well as others of the invention, will be more apparent from a consideration of an illustrative embodiment now to be described with reference to the accompanying schematic drawing. Shown therein is an illustrative system in accordance with the invention in which a plurality of subscriber lines are connected through a bridge-lifting device to a switching office common line terminal.

It will be noted that the drawing employs a type of notation referred to as "Detached Contact" in which an X, shown intersecting a conductor, represents a normally open "make" contact of a relay, and a "bar," shown intersecting a conductor at right angles, represents a normally closed "break" contact of a relay; "normally" referring to the unoperated condition of the relay. The principles of this type of notation are described in an article entitled "An Improved Detached-Contact-Type of Schematic Circuit Drawing" by F. T. Meyer, in the September, 1955, publication of *American Institute of Electrical Engineers Transactions, Communications and Electronics*, Volume 74, pages 505–513.

1. General Description

Referring now to the drawing, it is intended that the bridge-lifting apparatus shown thereon be associated with a conventional telephone switching system of the type disclosed in U.S. Pat. No. 2,587,817 of Mar. 4, 1952, issued to A. J. Busch et al. The present invention is not limited to use with a telephone switching system of this type but may be advantageously utilized with other types of switching systems. It is further intended that for the purpose of the present embodiment the above type of switching system be equipped with the range extension circuits such as disclosed in the aforementioned Feiner patent.

As denoted in the drawing the bridge-lifting apparatus 10 is shown in detail and connected in series with the No. 5 crossbar switching system 140 described in the Busch patent and party-line subscriber subsets S1 and S2. It is to be noted that bridge-lifting apparatus 10 may be located external to the switching system and that additional subscriber lines may be connected to bridge-lifter 10. For the sake of simplicity the well-known particulars of the switching office 140 and those of the subsets S1 and S2 have been omitted to simplify the drawing. Each of the party-line subscriber subsets S1 and S2 is connected by subscriber line facilities T1, R1, T2 and R2, respectively, to ports of the bridge-lifter 10 located, for the purpose of the present embodiment, in a telephone central office. A further port of bridge-lifter 10 is in turn connected by line conductors T and R to common party-line terminals P1 and P2 located on line link 11 of the switching system 140.

When a party-line subscriber located, for example, at subset S1 goes off-hook to place an outgoing call, or to receive an incoming call, bridge-lifter 10 is enabled to insert the high impedance windings of inductance L1 in series with subset S2 to remove the bridged impedance of line T2 and R2 from across the off-hook subscriber line T1 and R1.

In the event that one party-line subscriber should place a call, hereinafter referred to as a reverting call, to another subscriber who shares the same common party-line terminals, bridge-lifter 10 will insert transformer TR in series with the connection extending from reverting trunk 20 to the bridged combination of lines T1, R1, T2, and R2 to match the impedance of the bridged line facilities to that of the common party-line terminals P1 and P2.

2. Detailed Description

A. Outgoing or Intraoffice Trunk Connection

In the idle, or on-hook state, the party-line subset S1 of the present embodiment and the corresponding line facility T1 and R1 are bridged through the K3 relay windings and the parallel paths formed by break contacts K2–1, K2–2, and K1–8, K1–9, K2–4, K2–5, K1–11 and K1–12 of bridge-lifter 10 to the common party-line terminals P1 and P2 located in line link 11. In a likewise manner subset S2, via line facility T2 and R2, is bridged through the K4 relay windings and break contacts K1–11 and K1–12 to the common line T and R. The line facility T2 and R2 is further bridged across line facility T1 and R1 by means of break contacts K2–4, K1–8, K2–5, and K1–9.

Let it be assumed that a party-line subscriber located at subset S1 desires to place an outgoing call to another telephone subscriber who may be reached by a connection extending to the called subscriber from out trunk 18 or intraoffice trunk 17.

The party-line subscriber initiates a calling sequence by operating the switchhook of subset S1 to enable a direct current path to be placed across the T1 and R1 conductors of the corresponding line facility in the well-known manner by the closing of the switchhook contacts. Current will flow from ground in line link 11, through break contact LH–1, over conductor T to bridge-lifter 10, through the parallel paths represented by: break contact K2–2; break contacts K1–12, K2–5, K1–9; and the upper windings of transformer TR, inductance L1, and break contact K1–9; through the upper winding of relay K3, over conductor T1, through the direct current path of the off-hook subset S1, over conductor R1, the lower winding of relay K3, through the parallel paths represented by: break contact K2–1; break contacts K1–8, K2–4, K1–11; and break contact K1–8, inductance L1, and the lower windings of transformer TR, over conductor R, through the break contact LH–2 and the L relay winding to battery.

The current flowing through upper and lower windings operates the K3 relay. The operation of the K3 relay prepares an obvious path for the operation of relay K1 through make contacts K3–1. Relay K1, in operating, opens two of the three paths previously utilized to supply current to the off-hook subscriber's line T1 and R1 conductors at break contacts K1–9 and K1–8. However, relay K3 remains operated by the current supplied from the switching equipment through break contacts K2–1 and K2–2.

Operation of relay K1 also removes the prior bridged connection extending from the on-hook subscriber subset S2, over conductors T2 and R2 to the upper and lower windings of the K4 relay, through the parallel combination of break contacts; K1–12, K1–11; K2–5, K1–9, K2–4, and K1–8 from across the off-hook subscriber line to a new bridged connection extending from subset S2, over conductors T2 and R2 to relay K4, through break contacts K2–5 and K2–4, the upper and lower windings of the high impedance inductor L1 and through the make K1–6 and K1–7 contacts to the off-hook subscriber line.

Current flowing in the L relay winding operates the L relay of line link 11 to initiate a sequence described in the Busch patent, to cause line link 11 to energize the line link marker connector 12 to seize a marker 13. The marker thereupon, in the well-known manner, selects a trunk link 14 having an idle originating register 15 thereon and connects to the trunk link through a trunk link connector 16. In addition, the marker selects an idle channel from the off-hook subscriber line connected through the common line T and R conductors to trunk link 14 and delivers the identity and calling line equipment to the originating register.

At this time the off-hook subscriber at subset S1 proceeds to dial the called directory number into originating register 15. The manner of operation of the originating register in recording the called directory number is described in detail in the above-referred-to Busch patent at column 62 as well as in an article entitled "The Originating Dial Pulse Register Circuit for the No. 5 Crossbar System" by J. W. Dehn, *Bell Laboratories Record*, January, 1950, page 7. When the called directory number has been stored in the originating register 15, a marker 13 is engaged in the well-known manner and the called directory number, along with information relating to equipment location and identity of subset S1, is transferred to the marker.

Marker 13, as described in detail in the above-referred-to Busch patent, translates the called directory number and determines that the calling party-line subscriber subset S1 is to be connected to out trunk 18 should the subscriber desire to converse with another subscriber located in a distant switching office or to intraoffice trunk 17 if the connection is to be established to a called subscriber served by the same switching system as the calling party line subscriber.

Marker 13 then selects an idle trunk link 14 containing the required out trunk, or intraoffice trunk 17, by means of a trunk link connector 16. When the marker 13 seizes trunk link 14, a connection is established between line link 11 and trunk link 14 and the previous dialing connection is released. However, in seizing line link 11 by means of a line link connector 21 to test for an idle channel between the calling subscriber line and the selected trunk, marker 13, as disclosed in the previously cited A. Feiner patent, utilizes information received from line link 11 and line link connector 21 to operate relay IC of range extender circuit 120. Marker 13 then proceeds to establish a connection from the calling line through the amplifier of range extender circuit 120 to the selected trunk.

A transmission path now extends from the calling party-line subscriber at subset S1, over line facility T1 and R1 to bridge-lifter 10, through the low impedance windings of operated relay K3, the break contacts K2–1 and K2–2, over common line T and R to primary switch 110 of line link 11, through enabled make contacts IC–1 and IC–2 and the amplifier of range extender circuit 120, through the operated contacts of secondary switch 130 to trunk link 14 and the selected out trunk 18 or intraoffice trunk 17. The on-hook subset S2 is bridged to the above transmission path by the earlier described connection extending through the high impedance windings of inductor L1.

In summary, the impedance of the off-hook party-line subscriber facility T1 and R1 has been matched to the impedance of the common line T and R by removing the bridged impedance of the on-hook subscriber facility T2 and R2 from across the off-hook line.

B. Incoming Trunk Connection

Let it now be assumed that both of the party-line subscriber subsets S1 and S2 are on-hook. A terminating call may then be completed to a party-line subscriber from either incoming trunk 19 or intraoffice trunk 17. Marker 13, upon receipt of the called party-line subscriber directory number, initiates a sequence described in the Busch patent to establish a channel between a predetermined trunk on a trunk link 14 and the called subscriber line on line link 11. When line link 11 is seized through line link connector 21, marker 13, in the manner described by the Feiner patent, enables the operation of the IC relay in range extender circuit 120, and in the well-known manner, operates relay LH and establishes a connection from the predetermined incoming trunk 19, or intraoffice trunk 17, on trunk link 14 to secondary switch 130, through range extender circuit 120 and primary switch 110 to the common line T and R facility. Ringing may now be applied through bridge-lifter 10 to the bridged party line in the usual manner as described in the aforementioned Busch patent and also in an article entitled "Ringing Selection in No. 5 Crossbar," *Bell Laboratories Record*, April, 1950, page 168, by M. C. Goddard.

The called party-line subscriber, for example the subscriber located at subset S2, upon hearing the audible ringing signal lifts the receiver of subset S2 thereby closing the switchhook to place a direct current path across the T2 and R2 line facility. Direct current is supplied in a manner not shown but well known in the art by incoming trunk 19, or intraoffice trunk 17, to bridge-lifter 10 on common line T and R, through the parallel paths represented by: break contacts K1–11 and K1–12; break contacts K2–1, K1–8, K2–4, and K2–2, K1–9, and K2–5; the windings of transformer TR and inductance L1 to break contacts K2–4 and K2–5; through the K4 relay windings to the T2 and R2 line facility and the off-hook subset S2, to operate relay K4. The operation of relay K4 enables relay K2 to operate over an obvious path through make contact K4–1 and remove the bridging impedance of the on-hook subscriber line T1 and R1 from across line T and R at break contacts K2–1, K2–2, K2–4, K2–5. The on-hook subscriber line T1 and R1 is still connected to the off-hook subscriber line by a path extending through break contacts K1–8, K1–9 to high impedance windings of inductance L1 and make contacts K2–7 and K2–6.

The incoming trunk 19, or intraoffice trunk 17, is connected by a path extending through trunk link 14, line link 11, break contacts K1–11 and K1–12 of bridge-lifter 10 to line facility T2 and R2 of the off-hook subset S2. Thus, on an incoming call, bridge-lifter 10 removes the bridged impedance of the on-hook subset facility T1 and R1 from across the off-hook line facility T2 and R2 by inserting a high impedance in series with the bridged on-hook line thereby matching the impedance of the off-hook line facility to the impedance of the amplifier in range extender circuit 120.

C. Reverting Trunk Connection

When one party-line subscriber, for example the subscriber located at subset S1, desires to place a reverting call to another party-line subscriber sharing the same common party-line terminal, the calling subscriber removes the receiver from the switchook of subset S1 and upon receipt of dial tone proceeds to dial the called party-line subscriber directory number into an originating register 15 of the switching system. In the same manner as he previously described outgoing call sequence, originating register 15 transfers the called directory number and calling line equipment location to a marker 13.

Marker 13 determines that the calling line equipment location is the same as the called equipment location and then seizes a trunk line 14, by means of a trunk link connector 16, on which an idle reverting trunk 20 appears. The marker 13 proceeds, in the well-known manner, to set up the proper ringing codes in reverting trunk 20 and to establish a channel between the common party-line terminals P1 and P2 on line link 11 and the reverting trunk on trunk link 14. Marker 13 then releases from the connection and leaves reverting trunk 20 to supervise the call. The reverting trunk returns a busy signal to the calling party-line subscriber who then replaces the receiver on the switchhook of subset S1.

Reverting trunk 20 then applies regular ringing to the called party-line subscriber subset S2 and a reverting ringing signal to the calling party-line subscriber subset S1 in a manner described in the earlier cited article by M. C. Goddard. The called party-line subscriber, upon being notified of a reverting call, lifts the receiver off the switchhook of subset S2 and provides a path for the operation of relay K4 of bridge-lifter 10.

As earlier described under incoming calls, operation of relay K4 initiates a sequence to match the impedance of the off-hook line facility T2 and R2 to the input impedance of common line T and R by serially inserting the high impedance windings of inductance L1 into the T1 and R1 line facility to remove the bridging impedance of the on-hook subscriber line from across the off-hook line.

When the called party-line subscriber answers the reverting call, the removal of the receiver from the switchhook of subset S2, in addition to causing the operation of relay K4, also trips the ringing supplied from reverting trunk 20. The tripping of ringing notifies the calling party-line subscriber to lift the receiver of subset S1. The closing of the switchhook contacts connects a low direct current path across the T1 and R1 line facility. The direct current furnished by reverting trunk 20 over the switching system channel to common line T and R, flows through break contacts K1–11 and K1–12, make contacts K2–7 and K2–6, the windings of inductance L1, break contacts K1–8 and K1–9, the K3 relay windings, and line facility T1 and R1 to operate relay K3. Relay K3 in turn operates relay K1 over a path extending from battery, the K1 relay winding, make contact K3–1, and ground. The operation of relay K1 removes the off-hook subscriber line facility T2 and R2 from across the common T and R line at break contacts K1–11 and K1–12 and reconnects subset S2 to the common line by a path extending from line facility T2 and R2, through the K4 relay windings, make contacts K2–7 and K2–6, and the impedance matching TR transformer windings to common line T and R.

The calling party-line subscriber located at subset S1 is bridged to the above connection by a path extending from subset S1, over the T1 and R1 line facility, through the K3 relay windings and make contacts K1–7 and K1–6, to the TR transformer secondary windings. Insertion of the impedance matching transformer TR in series with the bridged subscriber line facilities and common line T and R is completed by the connection of capacitor C1, through make contacts K1–10 and K2–3, across the center tap of the windings of the TR transformer. Capacitor C1 provides a shunt path for voice frequency signals and, in addition, prevents the direct current supervisory signals from being shorted across the TR transformer windings. The capacitors C2 and C3 are connected across the TR transformer windings to stabilize the high frequency loss caused by the leakage inductance of the transformer windings.

Thus, on a reverting call, where the party-line subscriber located at subset S1 is conversing with the party-line subscriber of subset S2, or on an incoming or outgoing call to one party-line subscriber and the other party-line subscriber subset is in an off-hook state, the subscriber line facilities T1, R1, T2, and R2 are bridged together and their combined impedances are matched through the step-up windings of the TR transformer to the impedance of the common line T and R.

Summary

It is obvious from the foregoing that the facility, economy, and efficiency of party-line communication systems may be substantially enhanced by the provision of a bridge-lifter capable of matching the impedance of bridged off-hook party-line facilities to the input impedance of the common transmission line facility. It is further obvious from the foregoing that the aforesaid bridge-lifter's unique feature of matching the impedance of a single off-hook line facility, or the bridged impedances of several off-hook line facilities, to a common transmission line in response to signals generated by subsets connected to the party-line facilities, obviates the need for complex switching system equipment to perform the necessary isolation and bridge-lifting functions.

While the equipment of our invention has been disclosed in a party-line telephone system wherein the impedance of off-hook subscriber line facilities are matched to the impedance of a common party-line terminal, it is to be understood that such an embodiment is intended to be illustrative of the principles of our invention and that numerous other arrangements may be devised by those skilled in the art without departing from the spirit and scope of the invention.

Accordingly, while only a two-party line has been specifically disclosed, our invention may be employed with multiple party lines of more than two parties. Further, for example, a data device required to transit high quality data information to one or several different data devices could be connected to the switching system side of the bridge-lifter while other data devices are connected to the line side thereby allowing the impedance of the common data device to be at all times matched to the impedance of the other devices.

We claim:

1. In a communication system,
a transmission line,
a pair of station lines,
means for maintaining an impedance match between said transmission line and enabled ones of said station lines bridged to said transmission line comprising
inductance means,
impedance matching means,
first means responsive to an enabled state of either of said bridged station lines for selectively connecting said inductance means in series with the other said station line, and
second means responsive to the enabled state of said one station line in bridged combination with the enabled state of the other said station line for connecting said impedance matching means between said transmission line and both said bridged station lines.

2. In a communication system,
the combination set forth in claim 1 further comprising line relay means individual to each said station line and serially inserted in each said station line for detecting the enabled state of said station line.

3. In a communication system,
the combination set forth in claim 2 in which said second means further comprises means controlled by said line relay means of said one station line in combination with said line relay means of said other station line for indicating the said enabled state of all said lines.

4. In a communication system,
the combination set forth in claim 2 in which said first means and said second means comprise slave relay means individual to each said station line and controlled by said line relay means.

5. In a communication system,
the combination set forth in claim 4 in which said first means further comprises means controlled by the said slave relay means individual to each said other station line for directly connecting said one station line to said transmission line.

6. In a communication system,
the combination set forth in claim 1 in which said impedance matching means comprises means for equaling the reflected combined impedances of said bridged station lines and the impedance of said transmission line including transformer means having a secondary winding connected across said bridged station lines and a primary winding connected across said transmission line.

7. In a communication system,
the combination set forth in claim 6 in which said impedance matching means further comprises capacitive means connected in parallel with said windings of said transformer means.

8. In an impedance matching system,
a first port terminating apparatus having a predetermined level of impedance,
a pair of second ports, each connectable to said first port and operable to alternatively indicate a first and second state, said first state corresponding to said predetermined level of impedance, and
electromechanical switching means for maintaining an impedance match between said first port and said second ports by selectively connecting said second ports to said first port comprising
inductance means,
transformer means, means responsive to the first state of any one of said second ports concurrently with the second state of the other second port for serially inserting said inductance means between the other said second port and said first port, and means responsive to the first state of one of said second ports in bridged combination with the first state of the other said second port for serially inserting said transformer means between said first port and bridged ones of said second ports.

9. In a party-line telephone system, a switching network linkage path connected to a source of direct current, a plurality of telephone stations each comprising means for transmitting and receiving speech signals only when in an off-hook state and means for completing a direct current path when in said off-hook state, inductance means, transformer means, means associated with each of said stations for the transmission of said speech signals between a said off-hook station and said linkage path, means connected in series with each of said transmission means for detecting the flow of direct current in said transmission means, means controlled by said detecting means for connecting said transmission means to said linkage path, means operable in response to enabling of one of said detecting means of one of said stations in said off-hook state for matching impedance of said linkage path with impedance of said transmission means associated with said off-hook station by selectively connecting said inductance means in between said linkage path and said transmission means associated with each other said station, and means enabled by said enabling of said one detecting means in combination with said enabling of said other detecting means for maintaining said impedance match by connecting said transformer means between said linkage path and bridged ones of said transmission means associated with said off-hook stations.

10. In a party-line telephone system, a telephone switching network linkage path connected to a source of direct current, at least two telephone station subsets each comprising means for transmitting and receiving speech signals only when in an off-hook state and means for completing a direct current path when in said off-hook state, a plurality of conductor pairs wherein each said conductor pair is connected to one of said subsets for the transmission of said speech signals between said off-hook station and said linkage path, a plurality of inductors, a transformer, a plurality of line relays wherein each said line relay is connected in series with one of said conductor pairs for detecting the flow of direct current in said conductor pair, a plurality of other relays each individual to one of said line relays and controlled by said line relay, each said other relay comprising a plurality of break contacts corresponding to a released state and each said other relay further comprising a plurality of make contacts corresponding to an operated state, means comprising said break contacts for connecting said conductor pairs to said linkage path, means comprising said make contacts of any one of said other relays enabled by an enabled one of said line relays for matching impedance of said linkage path with impedance of one of said conductor pairs connected to an off-hook one of said subsets by selectively connecting said inductors in between said linkage path and each of the other said line relays, and means comprising the said make contacts of said enabled one other relay in combination with the said make contacts of enabled said other relays for maintaining said impedance match with bridged ones of said conductor pairs connected to said off-hook subsets by connecting said transformer between said linkage path and all said line relays connected in series with said bridged conductor pairs.

11. Bridge-lifting apparatus for matching impedance of first and second station lines connected to first and second ports of the bridge-lifting apparatus with impedance of switching equipment connected to a third port of the bridge-lifting apparatus comprising a first and a second relay connected respectively to said first and second ports in series with the first and second station lines, inductor means, impedance matching means, a first slave relay operated by said first relay and a second slave relay operated by said second relay, a first path connecting said first port to said third port and comprising break contacts of said second slave relay, a second path connecting said second port to said third port and comprising break contacts of said first slave relay, a third path including said inductor means connecting said first port to said third port and comprising make contacts of said second slave relay and break contacts of said first slave relay, a fourth path including said inductor means connecting said second port to said third port and comprising make contacts of said first slave relay and break contacts of said second slave relay, and means including further contacts of both said slave relays for maintaining said impedance match by selectively connecting said impedance matching means between bridged ones of said first and second ports and said third port.

* * * * *